US006628402B1

(12) United States Patent
Yamaba et al.

(10) Patent No.: US 6,628,402 B1
(45) Date of Patent: Sep. 30, 2003

(54) PHASE INTERFERENCE DETECTING METHOD AND SYSTEM IN INTERFEROMETER, AND LIGHT DETECTOR THEREFOR

(75) Inventors: Tuneo Yamaba, Odawara (JP); Hideo Ishimori, Ashigarakami-gun (JP)

(73) Assignee: Hitachi Electronics Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/414,498

(22) Filed: Oct. 8, 1999

(30) Foreign Application Priority Data

Oct. 12, 1998  (JP) ............................................ 10-289743

(51) Int. Cl.[7] ................................................. G01B 9/02
(52) U.S. Cl. ....................................... 356/489; 356/495
(58) Field of Search ................................. 356/489, 484, 356/485, 486, 487, 491, 492, 495

(56) References Cited

U.S. PATENT DOCUMENTS 6,008,901 A  * 12/1999  Ohtsuka ..................... 356/489

* cited by examiner

Primary Examiner—Frank G. Font
Assistant Examiner—Andrew H. Lee
(74) Attorney, Agent, or Firm—Antonelli, Terry, Stout & Kraus, LLP (57) ABSTRACT

In a phase interference detecting system with use of an interferometer, a height from a reference surface on a measurement surface is detected by receiving interference components of reflection lights from the reference surface and a measurement surface, which lights are divided from a laser beam and are modulated with a frequency being different therefrom, i.e., by irradiating only one laser beam. A light detector is constructed with a line type sensor for receiving the interference components of the reflection lights, and has a plurality of pixel groups for common use of a measurement surface and a plurality of pixel groups for exclusive use of a reference surface, which are provided at both thereof. A reference surface phase detecting means calculates a reference surface phase signal with respect to the pixels at a measurement point within the pixel group for common use of measurement surface, on a basis of an average value of signals of a predetermined number of pixel groups positioned at both sides in symmetric with respect to said measurement point. A measurement point phase calculating means calculates a measurement point phase signal of said reflection lights being incident upon the pixels at said measurement point on a basis of signals of the pixels at said measurement point. A height calculating means calculates out a signal corresponding to height of said measurement point by subtracting said reference surface phase signal from said measurement point phase signal.

22 Claims, 7 Drawing Sheets

AVERAGE AREA (RADICAL DIRECTION)

AVERAGE AREA (CIRCUMFERENTIAL DIRECTION)

| L3 | L2 | L1 | L0 | A | B | C | D | E | F | G | H | R0 | R1 | R2 | R3 | t1 |
| L3 | L2 | L1 | L0 | A | B | C | D | E | F | G | H | R0 | R1 | R2 | R3 | t2 |
| L3 | L2 | L1 | L0 | A | B | C | D | E | F | G | H | R0 | R1 | R2 | R3 | t3 |
| L3 | L2 | L1 | L0 | *A* | B | C | D | E | F | G | H | R0 | R1 | R2 | R3 | t4 |
| L3 | L2 | L1 | L0 | A | B | C | D | E | F | G | H | R0 | R1 | R2 | R3 | t5 |
| L3 | L2 | L1 | L0 | A | B | C | D | E | F | G | H | R0 | R1 | R2 | R3 | t6 |
| L3 | L2 | L1 | L0 | A | B | C | D | E | F | G | H | R0 | R1 | R2 | R3 | t7 |

FIG. 4b

AVERAGE AREA (RADICAL DIRECTION)

AVERAGE AREA (CIRCUMFERENTIAL DIRECTION)

| L3 | L2 | L1 | L0 | A | B | C | D | E | F | G | H | R0 | R1 | R2 | R3 | t1 |
| L3 | L2 | L1 | L0 | A | B | C | D | E | F | G | H | R0 | R1 | R2 | R3 | t2 |
| L3 | L2 | L1 | L0 | A | B | C | D | E | F | G | H | R0 | R1 | R2 | R3 | t3 |
| L3 | L2 | L1 | L0 | A | B | C | D | *E* | F | G | H | R0 | R1 | R2 | R3 | t4 |
| L3 | L2 | L1 | L0 | A | B | C | D | E | F | G | H | R0 | R1 | R2 | R3 | t5 |
| L3 | L2 | L1 | L0 | A | B | C | D | E | F | G | H | R0 | R1 | R2 | R3 | t6 |
| L3 | L2 | L1 | L0 | A | B | C | D | E | F | G | H | R0 | R1 | R2 | R3 | t7 |

PRIOR ART

FIG. 6b

PRIOR ART

FIG. 7a

PRIOR ART

FIG. 7b

PRIOR ART

FIG. 7c

PRIOR ART

PHASE INTERFERENCE DETECTING METHOD AND SYSTEM IN INTERFEROMETER, AND LIGHT DETECTOR THEREFOR

BACKGROUND OF THE INVENTION

1. Field of the Invention

The present invention relates to a method and a system for detecting a phase interference in an interferometer for detecting defects on a surface of a magnetic disc and so on, with use of phase interference of a light, as well as to a light detector therefor.

2. Description of Prior Art

In recent years, a standard specification is that a hard disc device is installed into a personal computer as an information storage medium thereof, and that the hard disc device has a storage capacity in an order of several G bytes. Also, in particular for a personal computer such as a note-book computer, it is desired that the hard disc device has a high density in the memory capacity but with a small volume thereof, so as to be installed therein.

For increasing the memory density of the hard disc device, it is necessary to make a magnetic head float or fly from the surface of a magnetic disc thereof at a very small amount of distance, such as from 20 nm to 50 nm. In the inspection of defects on the surface of the magnetic disc which is used in such the hard disc device, the defect inspection must be performed at high accuracy or precision corresponding to that floating or flying amount.

Conventionally, the inspection of defects on the surface of the magnetic disc is performed by an apparatus, known as a glide tester. This glide tester, while rotating the magnetic disc and flying the magnetic head at a predetermined flying amount, detects the number of collisions of the magnetic head against abnormal projections on the disc surface, thereby deciding a glide level (height of the projection on the magnetic disc surface) of that magnetic disc upon the basis of the number of the collisions.

However, when the flying amount comes to be very small in the value thereof, i.e., from 20 nm to 50 nm, the number of collision against projections also rises up, and also the magnetic head is frequently damaged by contacting or collision on the disc surface. Therefore, there is a problem that a large amount of time is needed for exchanging and positioning of the magnetic head.

Figure 5:
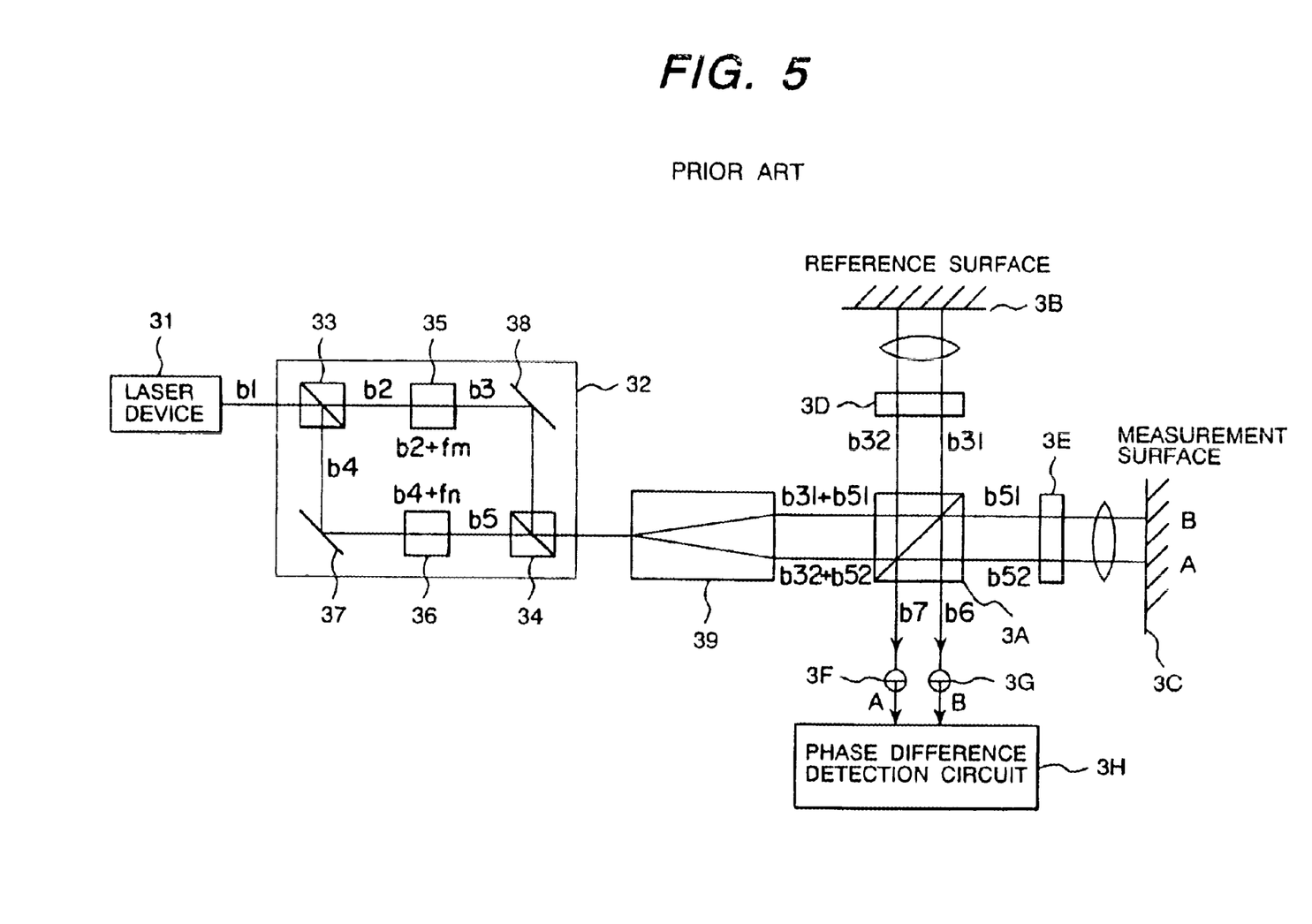
FIG. 5 shows an outline of the structure of an optical glide tester according to the conventional art.

Then, the height of the abnormal projections can be tested optically. An apparatus for such the test is known as "an optical glide tester". FIG. 5 shows the structure of the conventional optical glide tester. Basically, the optical glide tester is constructed with an interferometer. A laser device 31 emits a laser beam b1 of wavelength 532 nm there from. The laser beam b1 is modulated by a modulation means 32. The modulation means 32 comprises beam splitters 33 and 34, acousto-optic modulators (AOM) 35 and 36, and mirrors 37 and 38. The laser beam b1 is divided or separated into a reflection laser beam b4 and a penetration laser beam b2 by the beam splitter 33. The penetration laser beam b2 is incident upon the AOM 35, in which it is modulated with frequency fm, and is emitted as a laser beam b3 (=b2+fm). On the other hand, the reflection laser beam b4 is reflected by the mirror 37 again, to be incident upon the AOM 36, in which it is modulated with frequency fn, and is emitted as a laser beam b5 (=b2+fn). The laser beam b3 emitted from the AOM 35 is reflected by the mirror 38 so as to be incident upon the beam splitter 34. On the other hand, the laser beam b5 emitted from the AOM 36 is also incident upon the beam splitter 34. The laser beam b3 and the laser beam b5, both being incident upon the beam splitter 34, are combined or mixed so as to be incident upon a divider means 39.

The divider means 39 divides the combined laser beam b3+b5 into two laser beams b31+b51 and b32+b52, which are separated by a predetermined distance but are same in a direction of propagation and in a light path, and then they are emitted into a polarization beam splitter 3A. The polarization beam splitter 3A reflects portions of the two laser beams b31+b51 and b32+b52 (i.e., straight polarization lights b31 and b32 in a predetermined direction) to irradiate them upon a reference surface 3B, while it penetrates the remaining laser beams b51 and b52 so as to irradiate them on points A and B on a measurement surface 3C, respectively. Further, between the reference surface 3B and the polarization beam splitter 3A and also between the measurement surface 3C and the polarization beam splitter 3A, there are respectively provided ¼ wavelength plates 3D and 3E, both converting a linear polarization light into a circular polarization light. The laser beams b31 and b32 reflected upon the reference surface 3B penetrate through the polarization beam splitter 3A to be incident upon light detectors 3F and 3G respectively, since each of them is converted from the linear polarization light into the circular polarization light. The laser beams b51 and b52 which are reflected upon the measurement surface 3C, since they are also converted from the linear polarization lights into the circular polarization lights, are reflected upon the polarization beam splitter 3A to be incident upon light detectors 3F and 3G, respectively.

The light detectors 3F and 3G receive the combined laser beams b6 and b7 of the laser beams b31 and b32 which are reflected upon the reference surface 3B and the laser beam b51 and b52 which are reflected upon the measurement surface 3C, and output electric signals to a phase difference measurement circuit 3H depending thereupon. The phase difference measurement circuit 3H measures the height of the projection on the measurement surface 3C upon the basis of the electric signals from the light detectors 3F and 3G.

Figure 6A:
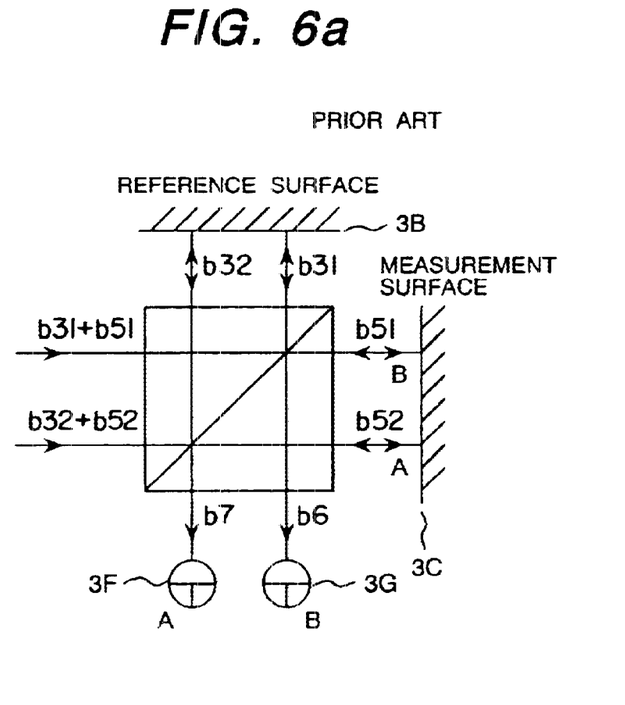
FIGS. 6A–6B show a principle in the detection on how the eight of projection or height between step levels is detected, in particular, in a case where there is no such the projection nor step on a measurement surface.
Figure 6B:
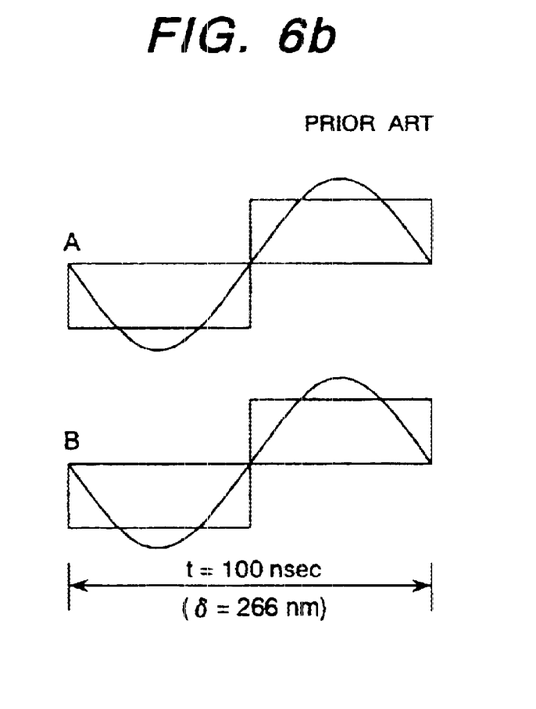
Figure 7A:
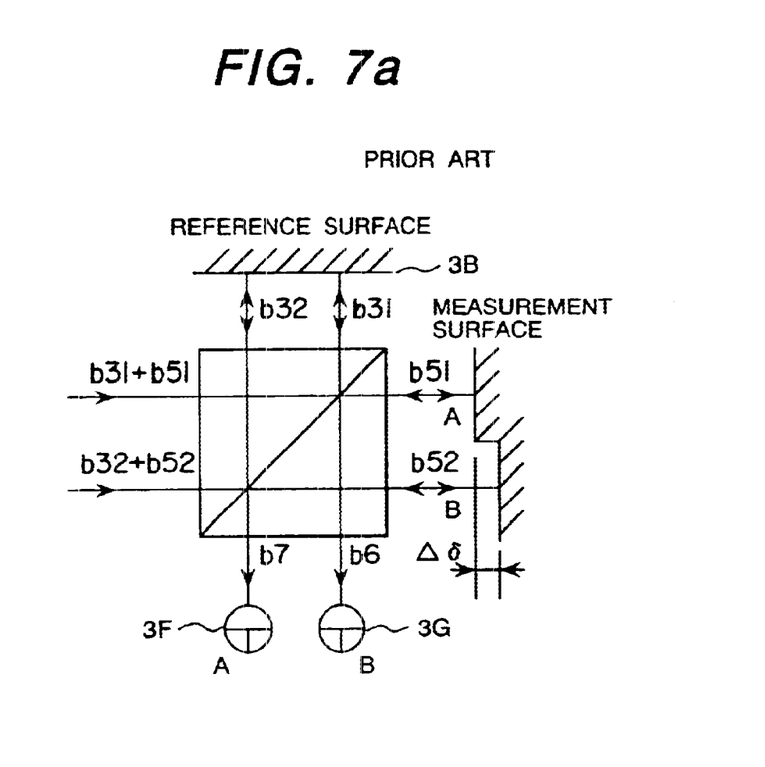
FIGS. 7A–7C show a principle in detection on how the height of projection or height between step levels is detected, in particular, in a case where there is such the projection or step of the height $\Delta\delta$ on the measurement surface.
Figure 7B:
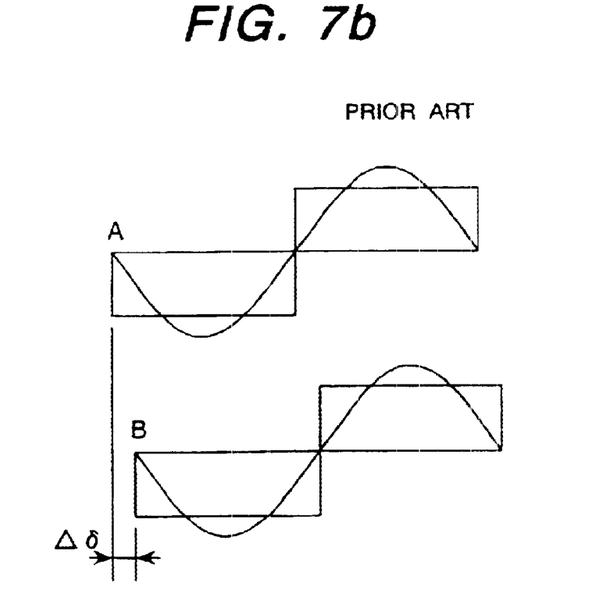
Figure 7C:
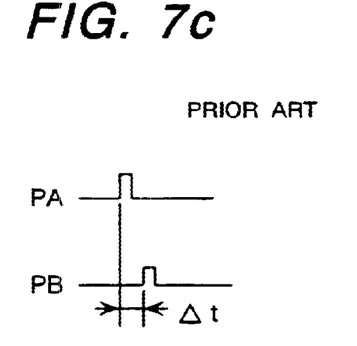

FIGS. 6A–6B and FIGS. 7A–7C explain a principle of how the height of the projection is detected. In particular, FIGS. 6A–6B show a case where no projection nor step is detected on the measurement surface, while FIGS. 7A–7C show a case where the projection or the step (including both pits and bumps or asperities) of height Δδ is detected thereon. In FIGS. 6A–6B and 7A–7C, only the polarization beam splitter 3A, the reference surface 3B, the measurement surface 3C, and the light detectors 3F and 3G are indicated therein. Upon incidence of the laser beams b6 and b7, interference output signals are outputted from the light detectors 3F and 3G, as indicated at the right-hand sides of the FIGS. 6A–6B and 7A–7C, respectively. From the laser device 31 is outputted a laser beam of wavelength 532 nm, and it is modulated by the modulator means 32, so that a frequency difference about 10 MHz can be obtained, i.e., a modulation frequency fm=150 MHz and a modulation frequency fn=140 MHz are obtained. According to this, each the light detectors 3F and 3G outputs an interference output signal. Since one cycle of this interference output signal corresponds to approximately one half (½) of the wavelength of the laser beam, 266 nm, it is possible to measure the heights at the points A and B on the measurement surface, i.e., the height when it is the projection, or the distance between the step levels when it is the step (including both pits and bumps or asperities), by measuring the phase difference between the interference signals which are outputted from those light detectors 3F and 3G.

In the case of FIGS. 6A–6B, since there is no projection nor step on the measurement surface 3C, the lights reflecting upon at the points A and B on the measuring surface 3C are incident upon the light detectors 3F and 3G, after passing through the same length of the optical path. Accordingly, the phases of the interference output signals of the light detectors 3F and 3G are same to each other. On a while, in the case of FIGS. 7A–7C, since there lies a step (including both pits and bumps or asperities) upon the measuring surface, as shown in the figure, a phase difference Δcorresponding to the distance between the levels of the step Δδ is generated in the interference output signals of the light detectors 3F and 3G. This phase difference Δt corresponds to the difference in the distance between the points A and B on the measurement surface 3C. Accordingly, by measuring this phase difference Δt, it is possible to detect the distance between the levels of the step (including both pits and bumps or asperities). The measurement of the phase difference Δt is conducted by comparing between a reference pulse PA which is obtained through pulsating the interference signal at the point A of the measurement surface 3C by a predetermined slice level, and a reference pulse PB which is obtained also through pulsating the interference signal at the point B of the measurement surface 3C by a predetermined slice level, in the phases thereof.

However, in the case where the one of the two laser beams is used for measurement while the other for the reference as in the manner of the conventional art, when other defect(s) or not the defect but minute concave-convex resides in the vicinity of the defect, the laser beam for the reference also receives the influence therefrom, then there is a problem that an accurate measurement cannot be obtained. Further, noise components generated in the sensor system for measurement (i.e., the light detector 3G) and the sensor system for reference (i.e., the light detector 3F) are averaged by sum of square thereof, then there is also a problem that a S/N ratio in total is decreased down therewith.

SUMMARY OF THE INVENTION

Accordingly, an object is, according to the present invention, for solving the problems as mentioned above, to provide a system and a method for detecting a phase interference in an interferometer, wherein a phase difference corresponding to the distance between the step levels or the height of projection(s) on a surface to be measured, can be measured by irradiating only one laser beam thereupon, as well as to provide a light detector being suitable for used therein.

According to an embodiment of the present invention, there is provided a phase interference detecting system for use in an interferometer, for detecting a height from a reference surface in a measurement surface, by receiving interference components in reflection lights from the reference surface and the measurement surface, which lights are divided from a laser beam and are modulated with frequencies being different therefrom.

The phase interference detecting system comprises: a light detector constructed with a line type sensor for receiving the interference components in reflection lights, and having a plurality of pixel groups for common use of a measurement surface and a plurality of pixel groups for exclusive use of a reference surface which are provided at both sides thereof; reference surface phase detecting means for calculating a reference surface phase signal for the pixels at a measurement point within the pixel group for common use of the measurement surface, on a basis of an average value of signals of a predetermined number of the pixel groups located symmetrically with respect to the measurement point at both sides thereof; measurement point phase calculating means for calculating a measurement point phase signal of the reflection lights being incident upon the pixels at the measurement point, on a basis of signals of the pixels at the measurement point; and height calculating means for calculating a signal corresponding to height of the measurement point by subtracting the reference surface phase signal from the measurement point phase signal.

In the phase interference detecting system with use of an interferometer, according to the present invention, the laser beam is divided by a beam splitter into two beams being orthogonal in polarization surfaces thereof. Frequency modulation is made on the divided laser beams so as to be irradiated upon the reference surface and the measurement surface. By observing an interference signal wave-form between those laser beams reflected upon the reference surface and the measurement surface, there can be detected a phase difference corresponding to the distance between the steps (including both pits and bumps or asperities) or the projection on the measurement surface. In the conventional arts, this interference signal wave-form is divided into two (2) for use as a reference point and for use as a measuring point, and the interference signal wave-forms are detected by the two (2) light detectors, respectively, so that the phase difference, i.e., the distance between the steps (including both pits and bumps or asperities) or the projection on the measurement surface is detected on the basis of that detected signals. According to the present invention, by detecting the only one (1) interference signal wave-form but not divided with the light detector, the distance between the steps or the projection on the measurement surface is detected. Then, according to the present invention, the light detector is constructed with a line type sensor, having a plurality of pixel groups for common use as the measurement surface and a plurality of pixel groups for exclusive use as the reference surface, which are provided at both sides thereof. The phase signals of the pixels at the measurement point are obtained on the basis of the signals of the pixels at the measurement point, directly. The phase signals of the pixels on the reference surface are obtained on the basis of an average value of the signals of the predetermined number of the pixel groups locating symmetrically at both sides of the pixels at that measurement point. This is also performed on the pixels for common use as the measurement surface. As a result, even if there is fine or minute concave-convex thereon, the noise in the phase of the reference surface is remarkably reduced, comparing to that in which the pixels for use of the reference surface are specified in advance, thereby bringing about an effect of increasing a repeatability.

Further, according to the present invention, there is provided the phase interference detecting system as described above, wherein each of the pixels for exclusive use of the reference surface is larger than that for common use of the measurement surface in a pixel area thereof. With this, it is possible to reduce or omit the number of circuits for processing the signals from the pixels for exclusive use as the reference surface, greatly.

Further, according to the present invention, there is provided the phase interference detecting system as described above, in which the reference surface phase detecting means produces the reference surface phase signal around a center of the measurement point phase signal by calculating an averaged value of the calculated reference surface phase signal for a predetermined time period; and the measurement point phase calculating means calculates the measurement point phase signal of the reflection lights being incident upon the pixels at the measurement point on a basis of the measurement point phase signal which is obtained by delaying the signals of the pixels at the measurement point for a half of a predetermined time period. With this, it is possible to dispose the pixel position of the measurement point at the center of the reference surface as a whole.

Further, according to the present invention, there is provided the phase interference detecting as described above, wherein the pixels of the group for common use as the measurement surface are divided into a predetermined number of groups so that the reference surface phase signal is calculated by the reference surface phase detecting means for each of the groups, and the signal corresponding to the height of the measurement point upon basis of the calculated reference surface phase signal and pixel signals which belong within the group. By calculating out the phase signals of the reference surface for the respective groups, the calculation can be simplified.

Also, also achieving the above object, according to another embodiment of the present invention, there is provide a phase interference detecting system for use in an interferometer, for detecting a height from a reference surface on a measurement surface, comprising: a laser device for generating a laser beam for detection; means for dividing the laser beam from the laser device into at least two laser beams; means for modulating the divided laser beams with frequencies being different to each other; means for combining the modulated laser beams as a single beam; means for irradiating the combined single laser beam upon a reference surface and upon a measuring point on the measurement surface, respectively, so as to cause reflections thereupon; a light detector of a line sensor type having a plurality of pixel groups therein, for receiving interference components between the reflection lights upon the reference surface and upon the measuring point so as to generate phase signals thereof, respectively; and a circuit for calculating a height signal upon basis of the phase signal generated by the reflection light upon the measuring point and an average value of the phase signals generated by the reflection lights upon the reference surface.

In addition, according to yet another embodiment of the present invention, there is also provided a phase interference detecting method for use in an interferometer, for detecting a height from a reference surface on a measurement surface, comprising following steps: dividing a laser beam from a laser device; modulating divided laser beams with frequencies being different therefrom; irradiating modulated laser beams upon a reference surface and a measurement surface; receiving interference components of reflection lights from the reference surface and the measurement surface, by means of a line type sensor having a plurality of pixel groups for common use of a measurement surface and a plurality of pixel groups for exclusive use of a reference surface which are located at the both side thereof; calculating a reference surface phase signal for the pixels at a measurement point within the pixel group for common use of measurement surface, on a basis of an average value of signals of a predetermined number of pixel groups positioned at the both sides in symmetric with respect to the measurement point; calculating a measurement point phase signal of reflection lights being incident upon the pixels at the measurement point, on a basis of signals of the pixels at the measurement point; and calculating a height signal corresponding to the height of the measurement point by subtracting the reference surface phase signal from the measurement point phase signal.

Further according to the present invention, there is also provided a phase interference detecting method for use in an interferometer, for detecting a height from a reference surface on a measurement surface, comprising: generating a laser beam for detection; dividing the laser beam into at least two laser beams; modulating each of the divided laser beams with frequencies being different to each other; combining modulated laser beams as a single beam; irradiating the combined single laser beam upon the reference surface and upon a measuring point on the measurement surface, respectively, so as to cause reflections thereupon; receiving interference components between the reflection lights upon the reference surface and upon the measurement point so as to generate phase signals thereof, respectively; and calculating a height signal upon basis of the phase signal generated by the reflection light upon the measuring point and an average value of the phase signals generated by the reflection lights upon the reference surface.

Also according to another embodiment of the present invention, there is provided a light detector for use in calculation of a signal corresponding to a height at a measurement point on a measurement surface with respect to a reference surface, in a phase interference detecting system for use in an interferometer. Such light detector comprises: a first plurality of pixel groups for common use of receiving lights reflected upon a measurement surface, each group being constructed with a plurality of pixels for receiving an interference component of a reflection light; a second plurality of pixel groups for exclusive use of receiving lights reflected upon a reference surface, each group being constructed with a plurality of pixels for receiving an interference component of a reflection light, and located at one end of said plurality of pixel groups for common use; and a third plurality of pixel groups for exclusive use of receiving lights reflected upon the reference'surface, each group being constructed with a plurality of pixels for receiving an interference component of a reflection light, and located at the other end of the plurality of pixel groups for common use, wherein the first, second and third plurality of pixel groups are aligned to one another so as to form a line type sensor.

DETAILED DESCRIPTION OF PREFERRED EMBODIMENTS

Hereinafter, embodiments according to the present invention will be fully explained by referring to the attached drawings.

Figure 1:
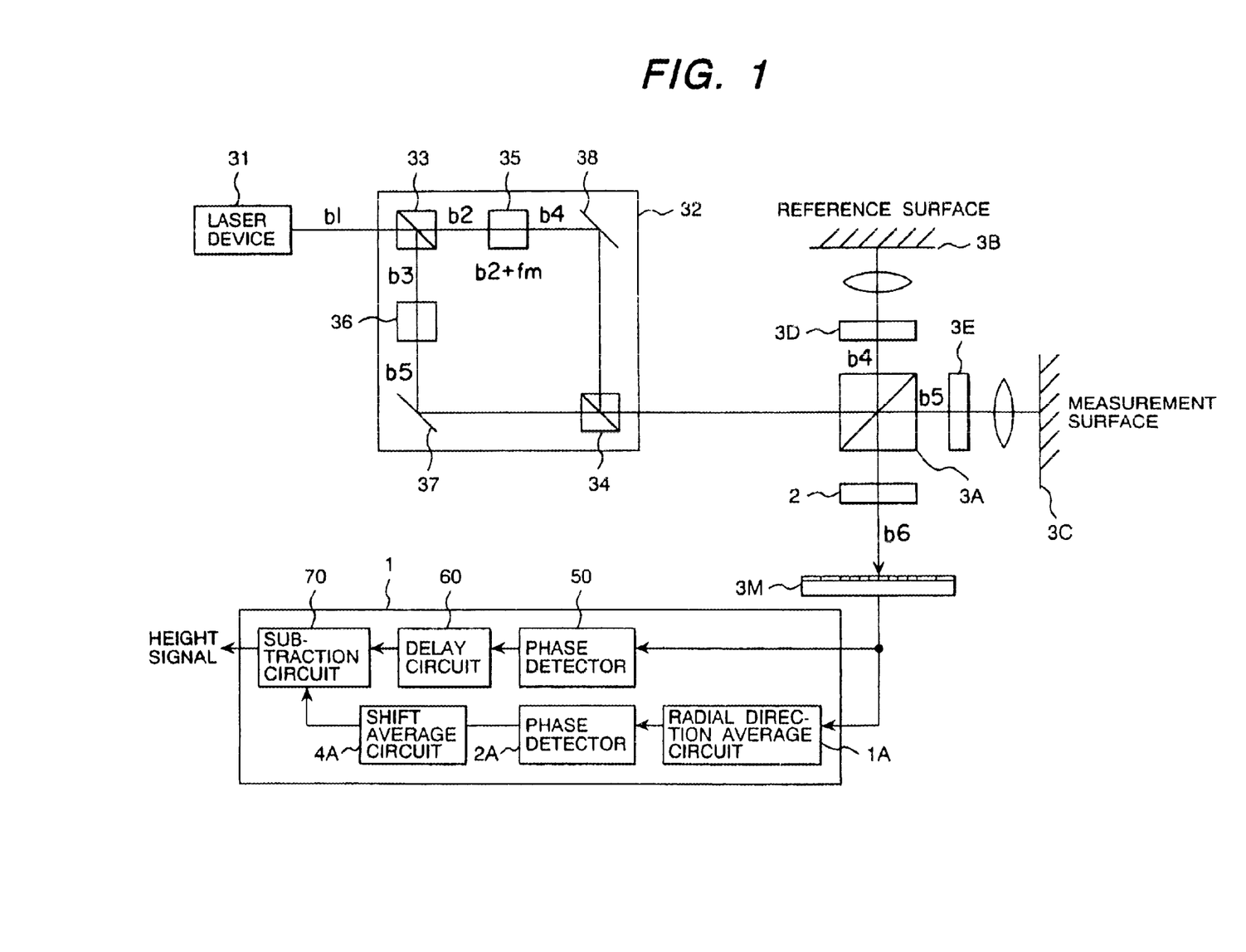
FIG. 1 shows an outline of the structure of a phase interference detecting system for use in an interferometer, according to an embodiment of the present invention.

FIG. 1 shows an outline of the construction of an embodiment of a system for detecting an phase interference in an interferometer, according to the present invention. A laser device 31 emits a laser beam b1 of wavelength 532 nm. A beam splitter 33 outputs two (2) polarization laser beams (i.e., a penetration laser beam b2 and a reflection laser beam b3) to acousto-optic modulators (AOM) 35 and 36. The AOM 35 modulates the penetration laser beam b2 with a frequency fm, and emits it onto a reflection mirror 38 as a laser beam b4 (=b2+fm). The AOM 36 modulates the reflection laser beam b3 with a frequency fn, and emits it onto a reflection mirror 37 as a laser beam b5 (=b3+fn). The laser beam b4 emitted from the AOM 35 is reflected upon the reflection mirror 38 to be incident upon beam splitter 33, while also the laser beam b5 emitted from the AOM 36 is reflected upon the reflection mirror 37 to be incident upon beam splitter 34. The laser beams b4 and b5 are combined to be incident upon a polarization beam splitter 3A.

The polarization beam splitter 3A reflects the laser-beam b4 so that it irradiates upon a reference surface 3B through a ¼ wavelength plate 3D, while passes the laser beam b5 so that it irradiates upon a measurement surface 3C through a ¼ wavelength late 3E. A linear polarization light passing through the ¼ wavelength plate 3D or 3E is converted into a circular polarization light. The laser beam b4 reflected upon the reference surface 3B is converted from the linear polarization light into the circular polarization light, therefore it penetrates through the polarization beam splitter 3A to be incident upon a light detector 3M through a polarization plate 2. While, since the laser beam b5 reflected upon the measurement surface 3C is also converted from the linear polarization light into the circular polarization light, it is reflected upon the polarization beam splitter 3A to be also incident upon the light detector 3M through the polarization plate 2. Namely, the ¼ wavelength plates 3D and 3E, each of which makes the polarization light element in the incident light and in the returning light intersect at right angles, leads the returning light onto the polarization plate 2. The polarization plate 2 takes out interfering component(s) from the laser beam b4 reflected upon the reference surface 3B and the laser beam b5 reflected upon the measurement surface 3C, so as to output them to the light detector 3M.

Figure 2:
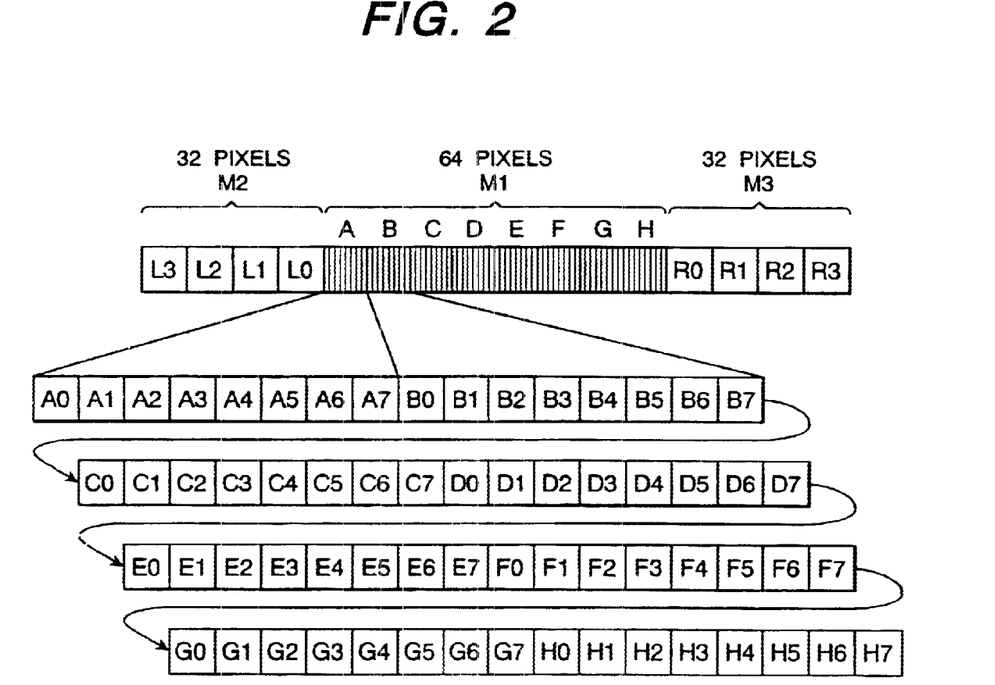
FIG. 2 shows the detailed construction of a light detector shown in FIG. 1.

The light detector 3M, as shown in FIG. 2, is constructed with a line type sensor comprising a pixel group M1 for common use of measurement surface (i.e., for receiving lights reflected upon the measurement surface 3C as well as the reference surface, in common), and pixel groups M2 and M3 for exclusive use of the reference surface (i.e., for receiving the lights reflected upon the reference surface, exclusively). The pixel group M1 for common use of the measurement surface is constructed with 64 pixels aligning in a longitudinal direction thereof. Those 64 pixels constructing the pixel group M1 for common use are divided into pixel groups A–H, each of which is formed with eight (8) pixels thereof. The pixels of those groups A–H are distinctively indicated with reference marks A0–A7, B0–B7, C0–C7, D0–D7, E0–E7, F0–F7, G0–G7, and H0–H7, respectively. The pixels of each of the pixel groups A–H are disposed or positioned continuously. The pixel group M2 for exclusive use of the reference surface is constructed with pixels L0–L3 having an area for 32 pixels in the pixel groups A–H. Also, the pixel group M3 for exclusive use of the reference surface is also constructed with pixels R0–R3 having an area for 32 pixels thereof. This is because, those pixel groups M2 and M3 for exclusive use of the reference surface are used for averaging input signals of the laser beams in a radial direction of a magnetic disc.

The light detector 3M of the line-type sensor is disposed in such a manner that the longitudinal direction thereof coincides with the radical direction of the magnetic disc. For obtaining a height signal from each pixel of the 64 pixels in the pixel group M1 for common use of the measurement surface, in this embodiment, is adopted a signal processing circuit 1 as shown in FIG. 1. Namely, though the height signal at each pixel is obtained by using two (2) light detectors for the measurement point and for the reference point according to the conventional art, however in this embodiment, such a height signal corresponding to each pixel is obtained only by use of a single light detector 3M.

Figure 3:
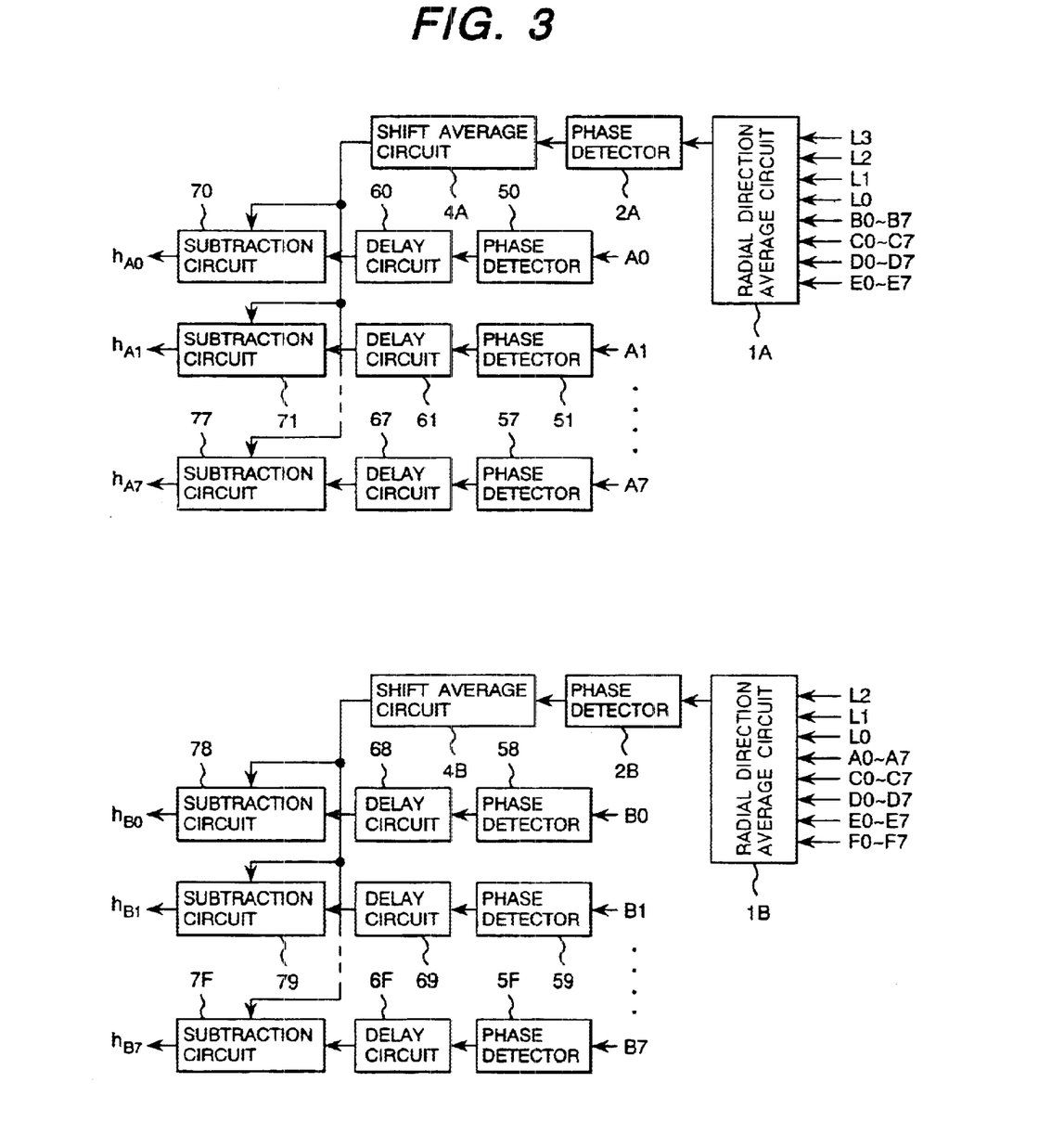
FIG. 3 shows the detailed construction of a portion of a signal processing circuit 1 shown in FIG. 1.

FIG. 3 shows a portion of the detailed construction of the signal processing circuit 1 shown in FIG. 1, in particular the portion which outputs the height signals of the respective pixels $h_{A0}$–$h_{A7}$ and $h_{B0}$–$h_{B7}$ in the pixel groups A and B shown in FIG. 2. Those for the pixel groups C to H are also same in the circuit construction thereof, therefore they are omitted to be shown in the figure. In FIG. 1, namely only a main part of the signal processing circuit 1 is disclosed therein.

In FIG. 3, a radial direction average circuit 1A, a phase detection circuit 2A, a shift average circuit 4A, phase detectors 50–57, delay circuits 60–67 and subtraction circuits 70–77 provide the height signals for the respective pixels A0–A7, while a radial direction average circuit 1B, a phase detection circuit 2B, a shift average circuit 4B, phase detectors 58–5F, delay circuits 68–6F and subtraction circuits 70–77 provide the height signals for the respective pixels B0–B7.

The radial direction average circuit 1A is provided for averaging pixel outputs of a section which can be considered to be symmetric with respect to the pixel group A as the measuring point (for example, areas corresponding 32 pixels at both sides therefrom). Namely, the radial direction average circuit 1A inputs the pixel outputs of the pixels L0–L3 which corresponds to the 32 pixels, locating at the left-hand side of the pixel group A, and the pixel outputs of the 32 pixels B0–B7, C0–C7, D0–D7, E0–E7 locating at the right-hand side thereof, so as to calculates out an average value of those outputs, i.e., averaging the pixel outputs in the radial direction of the magnetic disc.

The phase detection circuit 2A outputs a phase signal upon the basis of the average value of the pixel outputs which is outputted from the radial direction average circuit 1A. However, the method for detecting the phase is same to that in the conventional art, therefore the detailed expiation thereof will be omitted here.

Figure 4A:
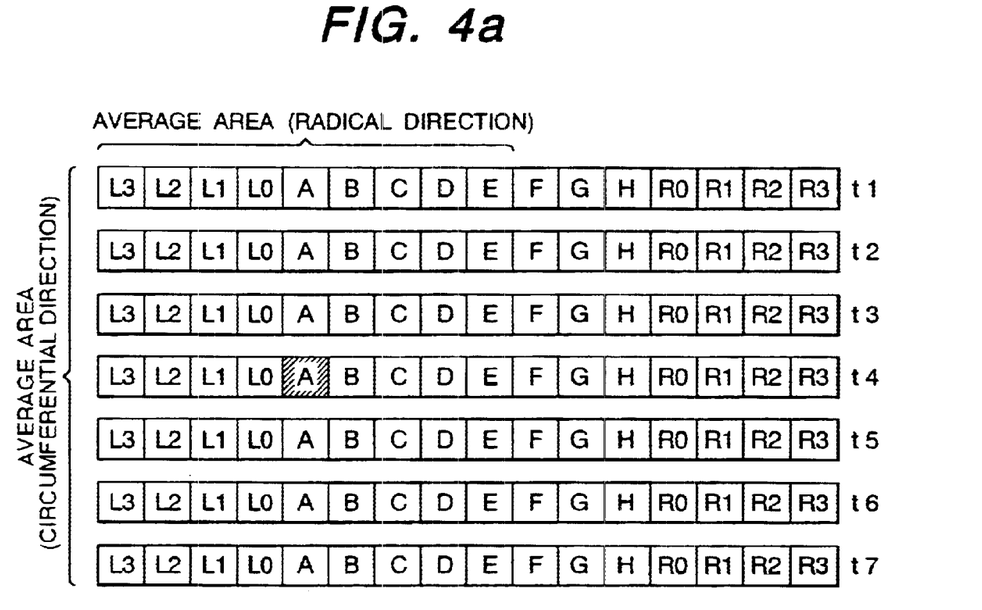
FIGS. 4A–4B show a principle in the operation of the portion of the signal processing circuit 1 shown in FIG. 1.
Figure 4B:
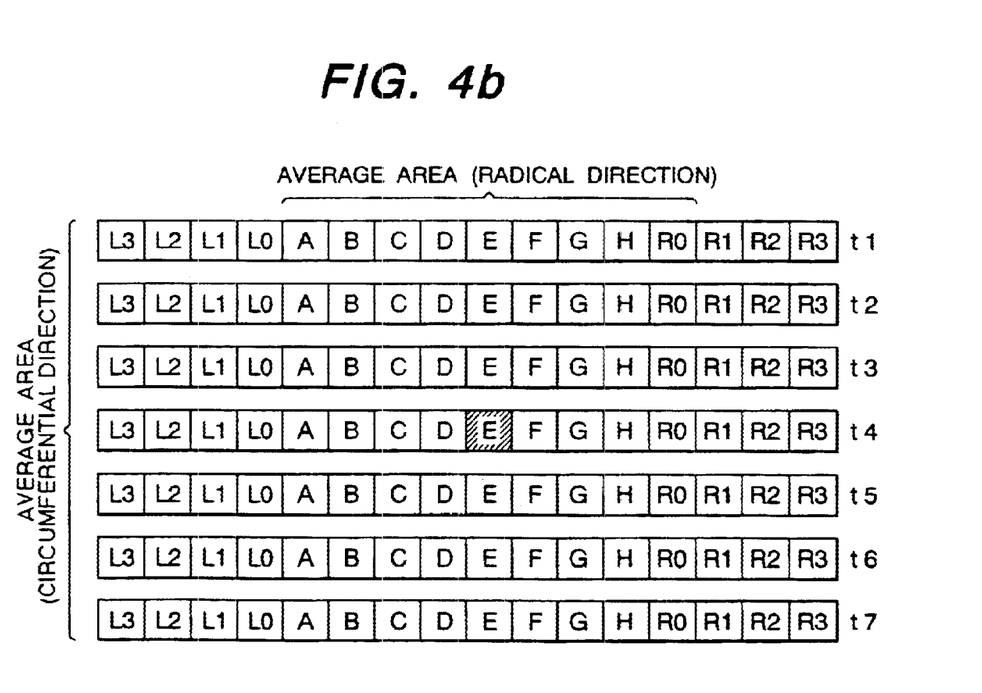

The shift average circuit 4A, being constructed with a combination of delay circuits, is provided for calculating out the phase signal as the average value of the phase signal in a circumference direction of the magnetic disc, which signal is obtained on the basis of the average value of the pixel outputs (i.e., the pixel outputs of the pixels L0–L3 and the pixel outputs of the 32 pixels B0–B7, C0–C7, D0–D7, and E0–E7) in such a manner that the pixel group A as the measuring point is located at a center of the average area. Namely, the shift average circuit 4A, as shown in FIGS. 4A–4B, memorizes the phase signals at respective time points t1–t7 when the phase detector 2A provides the outputs, and further calculates out the average value thereof, thereby setting up the phase signal of the pixel group A so that it comes to a center of the average area (i.e., the pixel group A at the time point t4), as shown in FIG. 4(A). FIG. 4(B) shows the situation where the phase signal of the pixel group E resides at the center of the average area. Further, when being averaged in the shift average circuit 4A, the signal at each time point may be weighted so as to make it to have a filtering characteristic therewith.

The phase detectors 50–57 input the pixel outputs of the pixels of the pixel group A, respectively, and each of them outputs the phase signal on the basis thereof. Each of the delay circuits 60–67 is provided for delaying the phase signal from each of the phase detectors 50–57 by a half (½) of the delay time in the shift average circuit 4A. This is a measure taken to cope with the predetermined time delay due to that the shift average circuit 4A is located at the center of the average area, and in particular seeing it focusing on the measurement point thereof, it is possible to make the correspondence on them by delaying only a half of the predetermined time. The subtraction circuits 70–77 subtract outputs of the shift average circuit 4A from outputs of the delay circuits 60–67, respectively, thereby outputting the height signals $h_{H0-H7}$ at the points corresponding to the incident lights of the respective pixels A0–A7. The height signals are also outputted in the similar manner for the other pixel groups B–H.

In the embodiment mentioned above, there is described, in particular, in a case where the phase signal on the reference surface is obtained by averaging the signals of a group(s) of the pixels located within a predetermined area(s) among the pixel groups being adjacent to the pixel group which includes the measurement point. However, the present invention should not limited only to this, and it may be also possible to average the signals of a group(s) of the pixels located within a predetermined area(s), not being adjacent to but being separate from the pixel group including the measurement point at a predetermined distance. This is because, a rate that the pixels adjacent to the pixels at the measurement point receive influences of those at that measurement point is high, therefore the phase signals on the reference surface contain noises therein. Also, explanation was given on the above-mentioned embodiment, in the case where the number of the pixels of the pixel group is eight (8), however it is only an example, and it is needless to mention that the number of pixels may be other than that. Further, the explanation was given only in the case where the pixels for exclusive use of reference surface are larger than the ordinary pixels, however it is also possible to construct them with the same pixels in sizes thereof.

Moreover, the phase interference detecting system according to the embodiment mentioned above and the light detector therefor can be also applied to, not only to the discs mentioned above, but also to semiconductor wafers, photo masks, reticles, glasses, etc.

While we have shown and described the embodiment(s) in accordance with our invention, it should be understood that disclosed embodiment(s) are susceptible of changes and modifications without departing from the scope of the invention. Therefore, we do not intend to be bound by the details shown and described herein but intend to cover all such changes and modification falling within the ambit of the appended claims.

What is claimed is:

1. A phase interference detecting system for use in an interferometer, for detecting a height from a reference surface in a measurement surface, by receiving interference components in reflection lights from said reference surface and said measurement surface, which lights are divided from a laser beam and are modulated with frequencies being different therefrom, comprising:

a light detector constructed with a line type sensor for receiving the interference components in said reflection lights, and having a plurality of pixel groups for common use of a measurement surface and a plurality of pixel groups for exclusive use of a reference surface which are provided at both sides thereof;

reference surface phase detecting means for calculating a reference surface phase signal for pixels at a measurement point within a pixel group for common use of the measurement surface, on a basis of an average value of signals of a predetermined number of the pixel groups located symmetrically with respect to said measurement point at both sides thereof;

measurement point phase calculating means for calculating a measurement point phase signal of said reflection lights being incident upon the pixels at said measurement point, on a basis of signals of the pixels at said measurement point; and height calculating means for calculating a signal corresponding to a height of said measurement point by subtracting said reference surface phase signal from said measurement point phase signal.

2. A phase interference detecting system as claimed in claim 1, wherein each of the pixels for exclusive use of the reference surface is larger than that for common use of the measurement surface in a pixel area thereof.

3. A phase interference detecting system as claimed in claim 1, wherein:

said reference surface phase detecting means produces the reference surface phase signal around a center of said measurement point phase signal by calculating an averaged value of the calculated reference surface phase signal for a predetermined time period; and said measurement point phase calculating means calculates out the measurement point phase signal of said reflection lights being incident upon the pixels at said measurement point on a basis of said measurement point phase signal which is obtained by delaying the signals of the pixels at said measurement point for a half of said predetermined time period.

4. A phase interference detecting system as claimed in claim 1, wherein the pixels of the pixel group for common use of the measurement surface are divided into a predetermined number of groups so that the reference surface phase signal is calculated by said reference surface phase detecting means for each of said groups, and the signal corresponding to the height of said measurement point is calculated upon basis of the calculated reference surface phase signal and the pixel signals which belong within said group.

5. A phase interference detecting system as claimed in claim 1, wherein said light detector comprises:

a first plurality of pixel groups for common use of receiving lights reflected upon said measurement surface, each pixel group being constructed with a plurality of pixels for receiving an interference component of a reflection light;

a second plurality of pixel groups for exclusive use of receiving lights reflected upon said reference surface, each pixel group being constructed with a plurality of pixels for receiving an interference component of a reflection light, and located at one end of said plurality of pixel groups for common use; and a third plurality of pixel groups for exclusive use of receiving lights reflected upon said reference surface, each pixel group being constructed with a plurality of pixels for receiving an interference component of a reflection light, and located at the other end of said plurality of pixel groups for common use, wherein said first, second and third plurality of pixel groups are aligned to one another so as to form a line type sensor.

6. A light detector as claimed in claim 5, wherein said second plurality of pixel groups and said third plurality of pixel groups are same in number of said pixel groups constructing thereof.

7. A phase interference detecting system for use in an interferometer, for detecting a height from a reference surface in a measurement surface, comprising:
 a laser device for generating a laser beam for detection;
 means for dividing the laser beam from the laser device into at least two laser beams;
 means for modulating divided laser beams with mutually different frequencies;
 means for combining modulated laser beams into a single laser beam;
 means for irradiating the single laser beam upon the reference surface and upon a measuring point on the measurement surface, respectively, so as to cause reflection lights thereupon;
 a light detector constructed with a line type sensor for receiving interference components in the reflection lights, and having a plurality of pixel groups for common use of the measurement surface and a plurality of groups for exclusive use of the reference surface which are provided at both sides thereof; and
 circuit means for calculating a height signal based upon a phase signal generated by the reflection lights upon the measuring point and an average value of phase signals generated by the reflection lights upon the reference surface.

8. A phase interference detecting system as claimed in claim 7, wherein the combined laser beam irradiating means comprises a polarization beam splitter.

9. A phase interference detecting system as as claimed in claim 8, further comprising:
 a polarization plate provided in a front of said light detector;
 a first wavelength plate provided between said polarization beam splitter and the reference surface; and
 a second wavelength plate between said polarization beam splitter and the measurement surface.

10. A phase interference detecting system as claimed in claim 7, wherein said circuit means comprises a subtraction circuit for subtracting the average value of the phase signals generated by the reflection lights upon the reference surface from the phase signals generated by the reflection lights upon at the measuring point.

11. A phase interference detecting system as claimed in claim 7, wherein said circuit means generates the average value of the phase signals in a radial direction of a magnetic disc.

12. A phase interference detecting system as claimed in claim 11, wherein said circuit means comprises delay circuits for delaying the phase signals for generating the average value of the phase signals in the radial direction of the magnetic disc.

13. A phase interference detecting system as claimed in claim 7, wherein said circuit means generates the average value of the phase signals in a circumference direction of a magnetic disc.

14. A phase interference detecting system as claimed in claim 12, wherein said circuit means comprises delay circuits for delaying the phase signals for generating the average value of the phase signals in the circumference direction of the magnetic disc.

15. A phase interference detecting method for use in an interferometer, for detecting a height from a reference surface on a measurement surface, comprising following steps:
 dividing a laser beam from a laser device;
 modulating divided laser beams with frequencies different therefrom;
 irradiating modulated laser beams upon said reference surface and said measurement surface;
 receiving interference components of reflection lights from said reference surface and said measurement surface, by means of a line type sensor having a plurality of pixel groups for common use of a measurement surface and a plurality of pixel groups for exclusive use of a reference surface which are located at the both side thereof;
 calculating a reference surface phase signal for pixels at a measurement point within a pixel group for common use of measurement surface, on a basis of an average value of signals of a predetermined number of pixel groups positioned at the both sides in symmetric with respect to said measurement point;
 calculating a measurement point phase signal of said reflection lights being incident upon the pixels at said measurement point, on a basis of signals of the pixels at said measurement point; and
 calculating a height signal corresponding to a height of said measurement point by subtracting said reference surface phase signal from said measurement point phase signal.

16. A phase interference detecting method as claimed in claim 15, wherein each of the pixels for exclusive use of the reference surface of said sensor is set to be larger than that for common use of the measurement surface in a pixel area thereof.

17. A phase interference detecting method as claimed in claim 15, wherein:
 said reference surface phase signal is produced around a center of said measurement point phase signal by calculating an averaged value of the calculated reference surface phase signal for a predetermined time period; and
 said measurement point phase signal of said reflection lights being incident upon the pixels at said measurement point is calculated on a basis of said measurement point phase signal obtained by delaying the signals of the pixels at said measurement point for a half of said predetermined time period.

18. A phase interference detecting method as claimed in claim 15, wherein the pixels of the pixel group for common use of the measurement surface are divided into a predetermined number of groups so that the reference surface phase signal is calculated for each of said groups, and the signal corresponding to the height of said measurement point is calculated upon basis of the calculated reference surface phase signal and pixel signals which belong within said group.

19. A phase interference detecting method for use in an interferometer, for detecting a height from a reference surface on a measurement surface, comprising:
 generating a laser beam for detection;
 dividing the laser beam into at least two laser beams;
 modulating divided laser beams with mutually different frequencies;
 combining modulated laser beams into a single laser beam;

irradiating the single laser beam upon the reference surface and upon a measuring point on the measurement surface, respectively, so as to cause reflections lights thereupon;

receiving interference components of the reflection lights from the reference surface the measurement surface, by means of a line type sensor having a plurality of pixel groups for common use of a measurement surface and a plurality of pixel groups for exclusive use of a reference surface which are located at both sides thereof; and calculating a height signal based upon phase signals generated by the reflection lights upon the measuring point and an average value of phase signals generated by the reflection lights upon the reference surface.

20. A phase interference detecting method as claimed in claim, 19, wherein the average value of the phase signals is calculated in either one of a radius direction and a circumference direction of a magnetic disc.

21. A light detector for use in calculation of a signal corresponding to a height at a measurement point on a measurement surface with respect to a reference surface, in a phase interference detecting system for use in an interferometer, comprising:

a first plurality of pixel groups for common use of receiving lights reflected upon said measurement surface, each pixel group being constructed with a plurality of pixels for receiving an interference component of a reflection light;

a second plurality of pixel groups for exclusive use of receiving lights reflected upon said reference surface, each pixel group being constructed with a plurality of pixels for receiving an interference component of a reflection light, and located at one end of said plurality of pixel groups for common use; and a third plurality of pixel groups for exclusive use of receiving lights reflected upon said reference surface, each pixel group being constructed with a plurality of pixels for receiving an interference component of a reflection light, and located at the other end of said plurality of pixel groups for common use, wherein said first, second and third plurality of pixel groups are aligned to one another so as to form a line type sensor.

22. A light detector as claimed in claim 21, wherein said second plurality of pixel groups and said third plurality of pixel groups are same in number of said pixel groups constructing thereof.

* * * * *